United States Patent

[11] 3,596,681

| [72] | Inventor | Arthur M. Elson<br>Hamilton Township, Mercer County, N.J. |
|---|---|---|
| [21] | Appl. No. | 884,414 |
| [22] | Filed | Dec. 12, 1969 |
| [45] | Patented | Aug. 3, 1971 |
| [73] | Assignee | Acme-Hamilton Manufacturing Corporation<br>Trenton, N.J. |

[54] FLANGE FOR HOSES
10 Claims, 2 Drawing Figs.

[52] U.S. Cl. ................................................. 138/109
[51] Int. Cl. .................................................. F16l 11/12
[50] Field of Search........................................... 138/109;
285/49, 229

[56] References Cited
UNITED STATES PATENTS

| 1,883,086 | 10/1932 | Swartz............................ | 138/109 X |
| 1,939,872 | 12/1933 | Bedur............................. | 138/109 X |
| 3,305,251 | 2/1967 | Skinner........................... | 285/229 |
| FOREIGN PATENTS | | | |
| 638,077 | 2/1962 | Canada ........................ | 138/109 |

Primary Examiner—Laverne D. Geiger
Assistant Examiner—Richard J. Sher
Attorney—Ostrolenk, Faber, Gerb & Soffen ABSTRACT: A hose construction having reinforced flanged ends which are firmly anchored through fabric of high tensile strength which, in turn, is anchored by a wire helix in the carcass portion of the hose, for coupling successive lengths of hose and forming a high-pressure resistant seal at the mating flanged end portions thereof. The mating pressure supplied by split coupling rings is highly concentrated in the region of the mating surfaces. A "fabric cushion" provided in the region of each mating surface significantly increases the springiness of the flanged end mating surfaces.

Patented Aug. 3, 1971  3,596,681

INVENTOR.
ARTHUR M. ELSON

BY
Ostrolenk, Faber, Gerb & Soffen

ATTORNEYS

FLANGE FOR HOSES

This invention relates to flexible hose having an integral flanged end, and more particularly concerns flanged hose for coupling hose sections employed for heavy-duty, high-pressure use, as in pumps, pipe lines and the like.

Conventional flanged end hose are restricted in use to a limited maximum working pressure; and should such pressure be exceeded, the hose may burst or may be pulled off at its end.

Accordingly, an object of this invention is to provide an improved flanged end hose construction having novel reinforcing and strengthening means which substantially increases the safe working pressures at which the same may be used; provides an excellent pressure resistant seal at mating flange surfaces; and facilitates rotation of the hose relative to the usual split metal flanges used for connecting the same, wherein the bolts of such metal flanges need only be loosened, and not removed from the hose flange.

Another object of this invention is to provide an improved flanged end hose wherein the flange portion thereof has a bevelled outer surface portion, thereby providing surplus material at the inner annular edge portion to form high pressure resistance seals.

Yet a further object of this invention is to provide in a flanged end hose, metal ring reinforcing means of a configuration and disposition as to transmit the pressures induced by bolting the split metal flanges associated with such hose, to the optimum portions of the sealing surfaces of the hose.

Still another object of this invention is to provide in a flanged end hose, fabric reinforcing extending from the carcass portion of the hose adjacent the flange portion thereof, into the flange portion, so as to make the hose resistant to high working pressures and substantially proof against bursting or pull off at the end.

These as well as other objects of this invention will become apparent upon consideration of the accompanying description and drawings, in which.

Essentially, the flanged end hose embodying the instant invention, comprises a molded flange portion having an improved annular outer sealing surface, and improved reinforcing means embedded within the flange portion, such reinforcing means comprising elements, configurations thereof and dispositions such as to provide very high pressure resistant seals.

Figure 1:
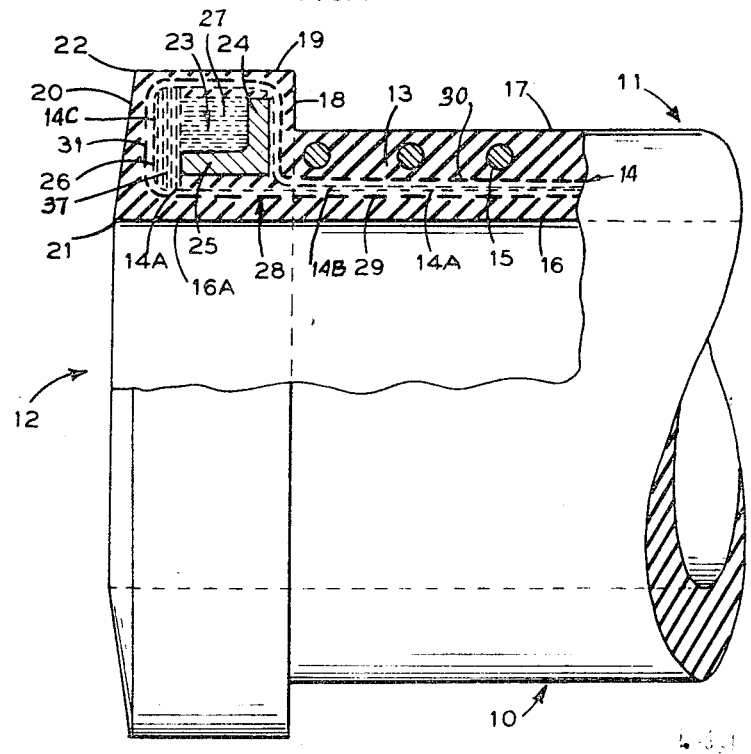
FIG. 1 is a side elevational view, partially sectionalized, showing a flanged end hose construction embodying the invention.

Thus, as shown in FIG. 1, 10 designates an end portion of a flanged end hose construction embodying the invention. The same comprises a tubular carcass portion generally indicated at 11, being formed of a selected elastomeric material such as natural or synthetic rubber, with suitable fabric and metal reinforcing embedded therein, in a manner known in the art. Further, hose 10 comprises a flange portion generally indicated at 12 disposed at, and integral with one end of carcass portion 11.

Carcass portion 11 may be formed on a mandrel, in a known manner, with the elastomeric body portion 13 thereof having the usual cotton duck reinforcing, indicated at 14, embedded therein. In addition, a wire helix 15 supplies further reinforcement. The reinforcing wire helix may extend over the entire length of hose or may extend away from the flange 12 for a distance of 2—4 inches toward the right. The portion 14a of fabric reinforcement 14 is disposed adjacent the inner surface 16. The remaining portion 14b of the fabric reinforcement imbedded in carcass portion 11, lies between wire helix 15 and fabric layer portion 14a.

The flange portion 12, is formed by the use of suitable molds, which will produce a flat, annular end surface 18 extending outwardly and at right angles to surface 17; an annular outer surface 19 substantially concentric to surface 17, and a flat front surface 20 which is bevelled and tapers from annular edge 21 which is the juncture of surface 20 with the extension 16A of inner surface 16 of carcass 11, to annular edge 22 which is the juncture of bevelled surface 20 and annular outer surface 19 of flange portion 12.

The flange portion 12 includes a novel reinforcing structure, and to that end, there is provided a ring-shaped metal member 23 of aluminum or other suitable metal or metal alloy. Member 23 is of right-angle cross section as is clearly shown in the sectionalized portion of FIG. 1, with one annular arm portion 24 thereof being disposed inwardly of and parallel to flange surface portion 18; the other annular arm portion 25 thereof being adjacent to and concentric with inner flange surface portion 16A. The outer end 26 of arm portion 25 extends toward bevelled surface 20 of flange portion 12, but is spaced therefrom. Said arm portion 25 is located intermediate annular edges 21 and 22, but may be somewhat closer to inner edge 21.

A plurality of concentric layers of rubber impregnated fabric such as cotton duck, indicated at 27, wrapped around the outer surface of arm portions 24 and 25 built up to a height substantially equal to the height of arm 24. The forwardly extending (i.e., left-hand end) portions 14A of fabric reinforcing 14, are wrapped about member 23 so as to substantially encircle ring 23. In addition, such reinforcement is materially augmented by cord fabric reinforcing including longitudinally extending, high tensile strands or filaments of cotton, nylon or the like. Such cord fabric reinforcing, generally indicated at 28, comprises a portion 29 disposed in carcass portion 11 adjacent inner surface 16 thereof, a portion 30, also in carcass portion 11 lying between wire helix 15 and cord portion 29 (and preferably upon fabric portion 14A), and a portion 31 wrapped about and encircling the arm portions 24, and 25 of member 23 as well as encircling the portion 14c of reinforcing fabric 14.

As a procedural matter, the wire helix 15 is applied after the reinforcing fabric 14 and cord fabric 28 are laid down enabling the wire helix 15 to provide excellent anchoring for the fabrics 14 and 28 and the ring 23.

A plurality of annular shaped layers 36 of rubber impregnated fabric such as cotton duck are placed within the rubber forming flange 12 and positioned between the left hand end surfaces of arm portion 25 and layers 27. Reinforcing fabric portion 14C and cord portion 31 surround the layers 37, which layers prevent the rubber in flange 12 lying between layers 37 and face 20 from becoming permanently set and further, prevent cutting of the rubber from eventual cutting of face 20. Layers 36 further act as a "fabric cushion" to significantly increase the "springiness" of face 20.

Figure 2:
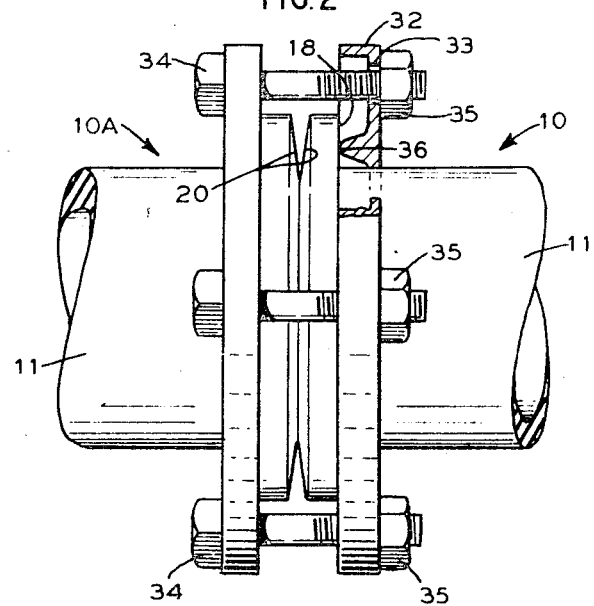
FIG. 2 is a side elevational view showing a pair of flanged end hoses of the type shown in FIG. 1, being interconnected by split flange members.

As shown in FIG. 2, the flanged end hose 10 may be coupled to a similar flanged end hose 10A, by means of the usual, split ring retainer flanges 32 having circumferentially spaced bolt openings 33 to receive the connector bolts 34 and their associated nuts 35. Flanges 32 are of the well known, split, hinged type. The inner bead portion 36 on flanges 32 directly abut the inner surface portions 18 of the hose flange portion 12.

When pressure is exerted against flange portions 12, by tightening the nuts 35 on connector bolts 34, such pressure is transmitted substantially across the entire face of arm 24 by way of ring shaped member 23. This surface pressure is then concentrated to the immediate region of the left-hand end of arm 25 to face 20, so as to compress the sealing surfaces 20 of hose 10, 10A together (which sealing surfaces are substantially less in surface area than the entire surface area of faces 20). The excess of elastomeric material in the seal surface extending to annular edge 21, provides a high pressure resistant seal, the bevelled seal surface 20 facilitating the build up of seal effect between the opposed sealing surfaces when nuts 35 are tightened.

It is understood that hose end 10 may also be coupled to the usual flanged end of metal piping or other conduits. A slight loosening of bolts 34 permits the flange portion 12 to be rotated relative to the opposed flange surface to which it is coupled, to adjust the relative opposed portions thereof so as to improve the seal obtained and further assure even wearing of inner surface 16.

The cord fabric utilized may preferably employ about 30 cords per inch in the "warp" direction (which is parallel to the central axis of the hose) and 2–3 cord per inch in the "fill" direction (which is concentric with the central axis).

The cord fabric reinforcing 28 is highly effective in affording substantially increased axial strength for hose 10 to meet very high working pressures since its unidirectional characteristic yields a tensile strength of the order of 950 pounds (in the "warp" direction), with much less bulk than that of hose duck, and provides significantly improved anchoring strength due to the wire helix 15 which is wrapped around portions 14A–14B and 29–30 of fabric 14 and cord 28 respectively.

The flanged hose described hereinabove has been found to withstand working pressures of the order of 250 pounds which was not heretofore attainable in conventional structures.

As various changes might be made in the embodiment of the invention herein disclosed without departing from the spirit thereof, it is understood that all matter herein shown or described shall be deemed illustrative and not by way of limitations, except as set forth in the appended claims.

The embodiments of the invention in which I claim an exclusive privilege or property are defined as follows:

1. A flexible hose comprising a tubular carcass portion and a flange portion at one end of said carcass portion, said carcass portion comprising a rubber body with reinforcing fabric embedded therein, said flange portion comprising molded rubber and reinforcing means embedded therein, said flange portion comprising a rear flat annular surface portion extending radially outward relative to the axis of said hose, a circumferential portion extending parallel to the axis of said hose and an annular front surface portion extending at an angle to the axis of said hose, said reinforcing means comprising an annular metal member of right angle cross section, one arm of said member extending parallel to the inner surface portion of said flange portion, the other arm of said member being concentric with the axis of said hose with the free end thereof extending toward the front surface portion of said flange portion;
   a first annular filler of concentric layers of fabric being wrapped about the outer of said other arm of said annular metal member;
   a second filler of annular shaped layers of fabric positioned so that said first layers and the free end of said other arm lies to one side of said second filler and said front surface portion lies on the opposite side of said second filler.

2. A hose as in claim 1 wherein said reinforcing means further includes reinforcing cord fabric having end portions thereof embedded in said carcass portion and an intermediate portion thereof encircling said annular metal member, to said first and second annular fillers.

3. A hose as in claim 1 wherein the free end of the second mentioned arm of said annular metal members extends to a position intermediate the annular edges of said front surface portion of the flange portion.

4. A hose as in claim 2 further comprising a wire helix embedded in said carcass portion between the inner and outer surfaces thereof and being wrapped around said reinforcing cord fabric end portions.

5. The hose of claim 1 wherein the layers of said first and second annular fillers are disposed at right angles to one another.

6. A flexible flanged hose construction comprising a tubular carcass portion including an elastomeric body and fabric reinforcing embedded therein, and a flange portion at one end of said tubular carcass portion, said flange portion comprising an inner end surface disposed at right angles to the axis of said hose, a circumferentially extending outer surface disposed parallel to the axis of said hose, and an outer end having a surface extending at an angle to the axis of said hose, and reinforcing means embedded in said flange portion, said reinforcing means comprising a ring shaped member of angular cross section, one arm of said ring shaped member flat disposed adjacent the inner end surface of said flange portion, the other arm of toward ring shaped member being parallel to the axis of said hose, the free annular edge of said fabric arm of the ring shaped member extending toward the outer surface portion of said flange portion, an annular filler of rubberized fabric disposed between the arms of said ring shaped member, and cord fabric embedded in said carcass and flange portions, said cord fabric including first and second portions disposed adjacent one of said tubular carcass portion and an intermediate portion encircling said annular filler and the arms of said ring shaped member.

7. A flexible hose comprising a tubular carcass portion and a flange portion at one end of said carcass portions, said carcass portion comprising reinforced elastomeric material, said flange portion comprising a molded elastomeric body and reinforcing means embedded in said body, said body including a flat annular, radially extending surface portion disposed at right angles to the axis of said hose, a front annular surface portion and a circumferentially extending outer surface portion parallel to the axis of said carcass portion, said reinforcing means comprising an annular member of angular cross section, one arm of said annular member extending parallel and adjacent to the rear flat annular surface of said flange portion, the other arm of said annular member extending toward the front annular surface portion of said flange portion; a first annular filler of concentric layers of fabric being wrapped about the outer surface of said other arm of said annular metal member; a second filler of annular shaped layers of fabric positioned so that said first layers and the free end of said other arm lies to one side of said second filler and said front surface portion lies on the opposite side of said second filler.

8. A hose construction comprising a tubular carcass portion and a flange portion at one end thereof, said carcass portion comprising elastomeric material and fabric reinforcing embedded in said elastomeric material, said flange portion comprising a molded body of elastomeric material with reinforcing means embedded in said molded body, said flange portion comprising a flat inner end surface extending normally of the hose axis, a bevelled outer end surface and a circumferentially extending surface, said reinforcing means comprising an annular metal member of angle cross section, one arm portion of said metal member extending parallel and adjacent said inner end surface of the flange portion, the other arm portion of said metal member extending parallel to the hose axis and toward the bevelled outer end surface of said flange portion, a filler of annular shaped layers of fabric embedded in said flange portion between said outer end surface and the free end of said other arm, said fabric reinforcing comprising woven fabric having its end portion embedded in said carcass portion and an intermediate portion embedded in said flange portion and cord fabric having its end portions embedded in said carcass portion and an intermediate portion embedded in said flange portion, the woven fabric being disposed inwardly of said cord fabric; said cord fabric and woven fabric portions encircling said annular metal member and said filler.

9. A hose as in claim 4 wherein the second mentioned arm of the annular metal member is adjacent the inner annular surface portion of the flange portion.

10. A hose as in claim 8 further comprising a wire helix embedded in said carcass portion between the inner and outer surfaces thereof and being wrapped around said reinforcing cord fabric end portions.